Patented Dec. 9, 1952

2,621,209

UNITED STATES PATENT OFFICE 2,621,209

PROCESS OF PRODUCING THIOSEMICARBAZONES

Walter Salzer, Wuppertal-Barmen, and Erich Goth, Wuppertal-Elberfeld, Germany, assignors to Schenley Laboratories, Inc., New York, N. Y., a corporation of Delaware No Drawing. Application March 3, 1950, Serial No. 147,562. In Switzerland March 4, 1949

10 Claims. (Cl. 260—516)

This invention relates to the production of thiosemicarbazones and has for an object the provision of an improved method or process for producing thiosemicarbazones of cyclic aldehydes. More particularly, the invention contemplates the provision of an improved method or process for producing thiosemicarbazones of cyclic aldehydes from thiosemicarbazones of ketones.

We have found that thiosemicarbazones of cyclic aldehydes can be produced by reacting thiosemicarbazones of ketones with cyclic aldehydes. Owing to the valuable properties of certain thiosemicarbazones of cyclic aldehydes, this new reaction is of great technical importance. Furthermore, it presents advantages over the hitherto used processes for the manufacture of thiosemicarbazones of cyclic aldehydes since thiosemicarbazones of ketones have recently become more readily available than thiosemicarbazide. Thiosemicarbazones of ketones can be obtained, for instance, in a simple manner by reacting hydrazine thiocyanate and ketones at an elevated temperature (cf. our co-pending application Ser. No. 147561 of the same date, now U. S. Patent 2,583,770, relating to "Process of Producing Thiosemicarbazones").

The invention is further illustrated by the following examples; parts being by weight.

Examples 1

Eight and five-tenths (8.5) parts of acetone-thiosemicarbazone are dissolved in eighty-five (85) parts of 30 per cent acetic acid aqueous solution and heated with a solution of seven and five-tenths (7.5) parts of benzaldehyde-4-carboxylic acid in one hundred and fifty (150) parts of methanol for some time. The thiosemicarbazone of benzaldehyde-4-carboxylic acid precipitates and is isolated after cooling. The yield is seven and five-tenths (7.5) parts of the thiosemicarbazone of benzaldehyde-4-carboxylic acid.

The following benzalthiosemicarbazones may be obtained from acetone-thiosemicarbazone in the same manner: m-nitrobenzalthiosemicarbazone of the melting point 235° C., p-ethylsulfone-benzalthiosemicarbazone of the melting point 238° C., 2-chloro-5-nitrobenzalthiosemicarbazone of the melting point 250° C., 4-acetamidobenzalthiosemicarbazone of the melting point 233° C.

Example 2

Three and four-tenths (3.4) parts of cyclohexanone-thiosemicarbazone are dissolved in seventy (70) parts of hot 50 per cent acetic acid aqueous solution and heated to the boiling temperature for some time with a solution of three and two-tenths (3.2) parts of 4-acetamidobenzaldehyde in fifty (50) parts of water. After cooling, three and six-tenths (3.6) parts of 4-acetamidobenzalthiosemicarbazone are filtered off under suction. The melting point after recrystallizing from methanol-sodium hydroxide solution is 233° C.

We claim:

1. Process for making thiosemicarbazones of aromatic aldehydes that comprises heating a mixture comprising (1) the thiosemicarbazone of an aliphatic monoketone selected from the group consisting of lower alkanones and cyclohexanone, and (2) a substantially equimolecular proportion of a benzaldehyde, in an aqueous solvent medium at an elevated temperature below the boiling point of the medium, and recovering the benzaldehyde thiosemicarbazone from the reaction mixture.

2. Process as defined in claim 1 wherein the aqueous solvent medium is an aqueous solution of a simple organic carboxylic acid.

3. Process as defined in claim 2 wherein the aqueous solvent medium is an aqueous solution of acetic acid.

4. Process as defined in claim 3 wherein the thiosemicarbazone of an aliphatic monoketone is the thiosemicarbazone of acetone.

5. Process as defined in claim 4 wherein the benzaldehyde is benzaldehyde-4-carboxylic acid.

6. Process as defined in claim 4 wherein the benzaldehyde is p-ethylsulfone-benzaldehyde.

7. Process as defined in claim 4 wherein the benzaldehyde is 2-chloro-5-nitro-benzaldehyde.

8. Process as defined in claim 1 wherein the aqueous solvent medium is an aqueous solution of acetic acid, the aliphatic monoketone thiosemicarbazone is the thiosemicarbazone of cyclohexanone.

9. Process as defined in claim 8 wherein the benzaldehyde is p-acetylamidobenzaldehyde.

10. Process for making 4-acetylamido-benzalthiosemicarbazone that comprises heating a mixture comprising acetone thiosemicarbazone with a substantially equimolecular proportion of 4-acetylamidobenzaldehyde in an aqueous solution of acetic acid at an elevated temperature below the boiling point of the mixture and recovering 4-acetylamido-benzalthiosemicarbazone from the reaction mixture.

WALTER SALZER.
ERICH GOTH.

No references cited.